US012148167B2

(12) United States Patent
Chih et al.

(10) Patent No.: US 12,148,167 B2
(45) Date of Patent: Nov. 19, 2024

(54) IMAGE PROCESSING CIRCUIT AND ASSOCIATED IMAGE PROCESSING METHOD

(71) Applicant: Realtek Semiconductor Corp., HsinChu (TW)

(72) Inventors: Chung-Yan Chih, HsinChu (TW); Wen-Tsung Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 340 days.

(21) Appl. No.: 17/740,341

(22) Filed: May 9, 2022

(65) Prior Publication Data

US 2023/0063787 A1    Mar. 2, 2023

(30) Foreign Application Priority Data

Aug. 24, 2021 (TW) ................................. 110131199

(51) Int. Cl.
*G06T 5/70* (2024.01)
*G06T 7/13* (2017.01)

(52) U.S. Cl.
CPC . *G06T 7/13* (2017.01); *G06T 5/70* (2024.01)

(58) Field of Classification Search
None
See application file for complete search history.

(56) References Cited

U.S. PATENT DOCUMENTS

| | | | | |
|---|---|---|---|---|
| 5,870,494 A | * | 2/1999 | Kanda | G06V 10/443 382/203 |
| 2006/0001688 A1 | * | 1/2006 | Chabreck | B82Y 40/00 347/19 |
| 2015/0228058 A1 | * | 8/2015 | Murahashi | G09G 5/026 382/254 |

FOREIGN PATENT DOCUMENTS

| CN | 105513037 | * | 4/2016 | ............... G06T 7/00 |
| JP | 2008003063 | * | 1/2008 | ............... G06T 1/00 |

* cited by examiner

*Primary Examiner* — Beniyam Menberu
(74) *Attorney, Agent, or Firm* — Winston Hsu

(57) ABSTRACT

The present invention provides an image processing method, wherein the image processing method includes the steps of: using a plurality of corner detection filters to perform corner detection on a specific pixel of image data to generate a plurality of detection results, respectively, wherein the plurality of corner detection filters correspond to a plurality of corners with different directions, respectively; determining which one of the plurality of corners with different directions the specific pixel belongs to according to the plurality of detection results; and according to a specific corner among the plurality of corners to which the specific pixel belongs, performing an image processing operation corresponding to the specific corner on the specific pixel to generate processed image data.

14 Claims, 11 Drawing Sheets

| P1N | | | | | ... | PMN |
|---|---|---|---|---|---|---|
| ⋮ | ⋮ | ⋮ | ⋮ | ⋮ | ...... | ⋮ |
| P15 | P25 | P35 | P45 | P55 | | |
| P14 | P24 | P34 | P44 | P54 | | |
| P13 | P23 | P33 | P43 | P53 | | |
| P12 | P22 | P32 | P42 | P52 | | |
| P11 | P21 | P31 | P41 | P51 | | PM1 |

Corner detection filter (corner 1)

Corner detection filter (corner 3)

Corner detection filter (corner 5)

Corner detection filter (corner 7)

Corner detection filter (corner 0)

Corner detection filter (corner 2)

Corner detection filter (corner 4)

Corner detection filter (corner 6)

Corner protection filter (corner 0)

Corner protection filter (corner 1)

Corner protection filter (corner 2)

Corner protection filter (corner 3)

Corner protection filter (corner 4)

Corner protection filter (corner 5)

Corner protection filter (corner 6)

Corner protection filter (corner 7)

|   |   | -3 | -1 |
|---|---|----|----|
|   | -3 | -1 | 6 |
| -3 | -1 | 8 |   |
|   | -3 | -1 | 6 |
|   |   | -3 | -1 |

Contrast difference calculation (corner 0)

| -3 | -3 | -3 | -3 |   |
|----|----|----|----|---|
| -3 | -1 | -1 | -1 |   |
| -3 | -1 | 8 | 6 |   |
| -3 | -1 | 6 |   |   |
|    |    |   |   |   |

Contrast difference calculation (corner 1)

FIG. 10

IMAGE PROCESSING CIRCUIT AND ASSOCIATED IMAGE PROCESSING METHOD

BACKGROUND OF THE INVENTION

1. Field of the Invention

The present invention relates to an image processing circuit.

2. Description of the Prior Art

In image processing methods, since corners in images are important features, some corner detection methods have been developed and applied to the image processing methods. The current corner detection methods, such as Harris corner detection method, uses image spatial differentiation and structural tensor to detect corners in the image, however, these corner detection methods with complex calculations are not suitable to be implemented by using hardware circuits.

In addition, in the current image processing circuit, an edge filter such as a Sobel operator is usually used for edge detection, and the detected edge in the image is processed. However, the current edge detection cannot effectively detect the corners in the image, so it may cause defects when processing the edge in the image. For example, if the image contains a rectangle, the image processing circuit may determine the four corners of the rectangle as oblique sides, and thus the pixels at the four corners are regarded as noise and smoothed, resulting in the four corners of the rectangle become blurred and the image quality is reduced.

In light of above, how to propose a corner detection method suitable to be implemented by hardware circuits to effectively detect corners with different directions in the image and perform suitable image processing to these corners is an important issue.

SUMMARY OF THE INVENTION

It is therefore an objective of the present invention to provide an image processing method, which can detect corners in different directions in the image by using corner detection filters, and use suitable image processing methods for the corners in different directions, to solve the problems described in the prior art.

According to one embodiment of the present invention, an image processing method comprises the steps of: using a plurality of corner detection filters to perform corner detection on a specific pixel of image data to generate a plurality of detection results, respectively, wherein the plurality of corner detection filters correspond to a plurality of corners with different directions, respectively; determining which one of the plurality of corners with different directions the specific pixel belongs to according to the plurality of detection results; and according to a specific corner among the plurality of corners to which the specific pixel belongs, performing an image processing operation corresponding to the specific corner on the specific pixel to generate processed image data.

According to one embodiment of the present invention, an image processing circuit comprising a corner detection circuit and a corner and edge processing circuit is disclosed. The corner detection circuit is configured to use a plurality of corner detection filters to perform corner detection on a specific pixel of image data to generate a plurality of detection results, respectively, wherein the plurality of corner detection filters correspond to a plurality of corners with different directions, respectively; and determine which one of the plurality of corners with different directions the specific pixel belongs to according to the plurality of detection results. According to a specific corner among the plurality of corners to which the specific pixel belongs, the corner and edge processing circuit performs an image processing operation corresponding to the specific corner on the specific pixel to generate processed image data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows an image frame.

FIG. 10 is a diagram illustrating a plurality of operations for contrast difference calculation according to one embodiment of the present invention.

DETAILED DESCRIPTION

Figure 1:
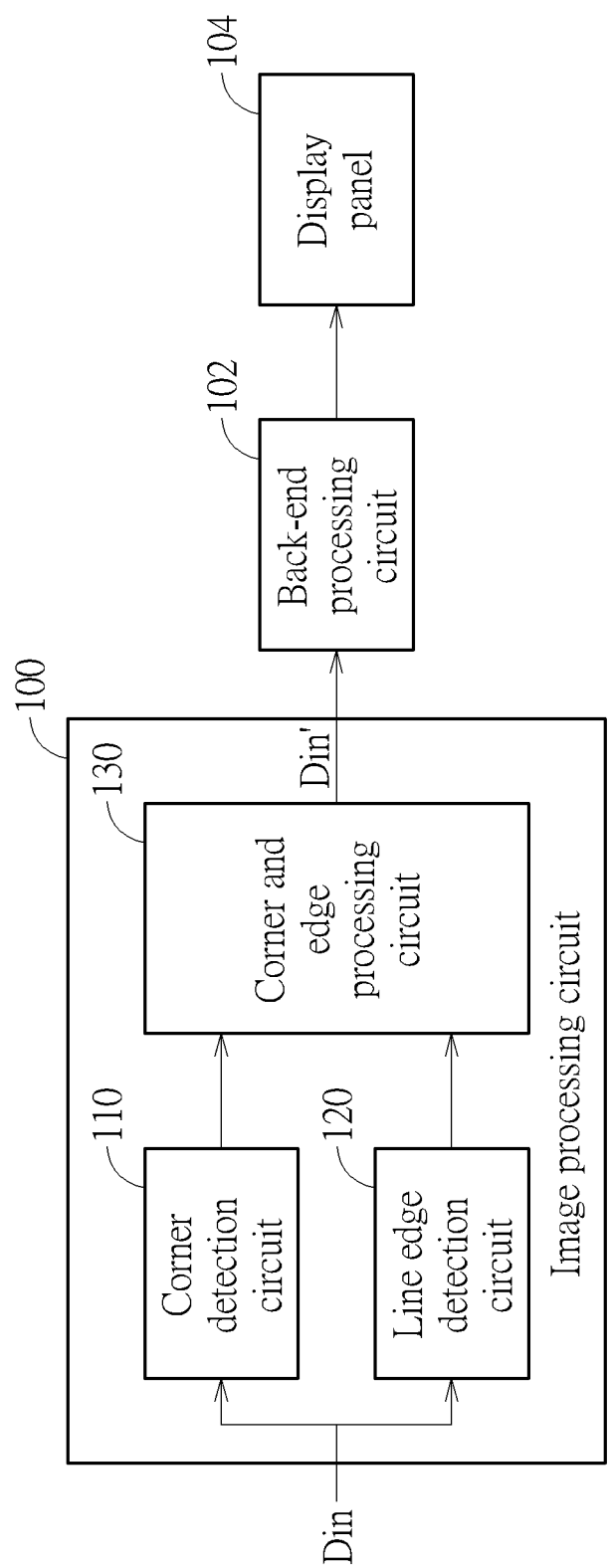
FIG. 1 is a diagram illustrating an image processing circuit according to one embodiment of the present invention.

FIG. 1 is a diagram illustrating an image processing circuit 100 according to one embodiment of the present invention. As shown in FIG. 1, the image processing circuit 100 comprises a corner detection circuit 110, a line edge detection circuit 120 and a corner and edge processing circuit 130. The image processing circuit 100 is used to receive image data Din, and perform image processing on the image data Din, such as noise removal, edge enhancement, etc., to generate processed image data Din'. Then, after the processed image data Din' is processed by a back-end processing circuit 102, it is sent a display panel 104 and displayed thereon. In this embodiment, the image processing circuit 100 can be applied to any electronic device that needs to perform image processing, such as an image signal processor (ISP) in a camera.

Figure 2:
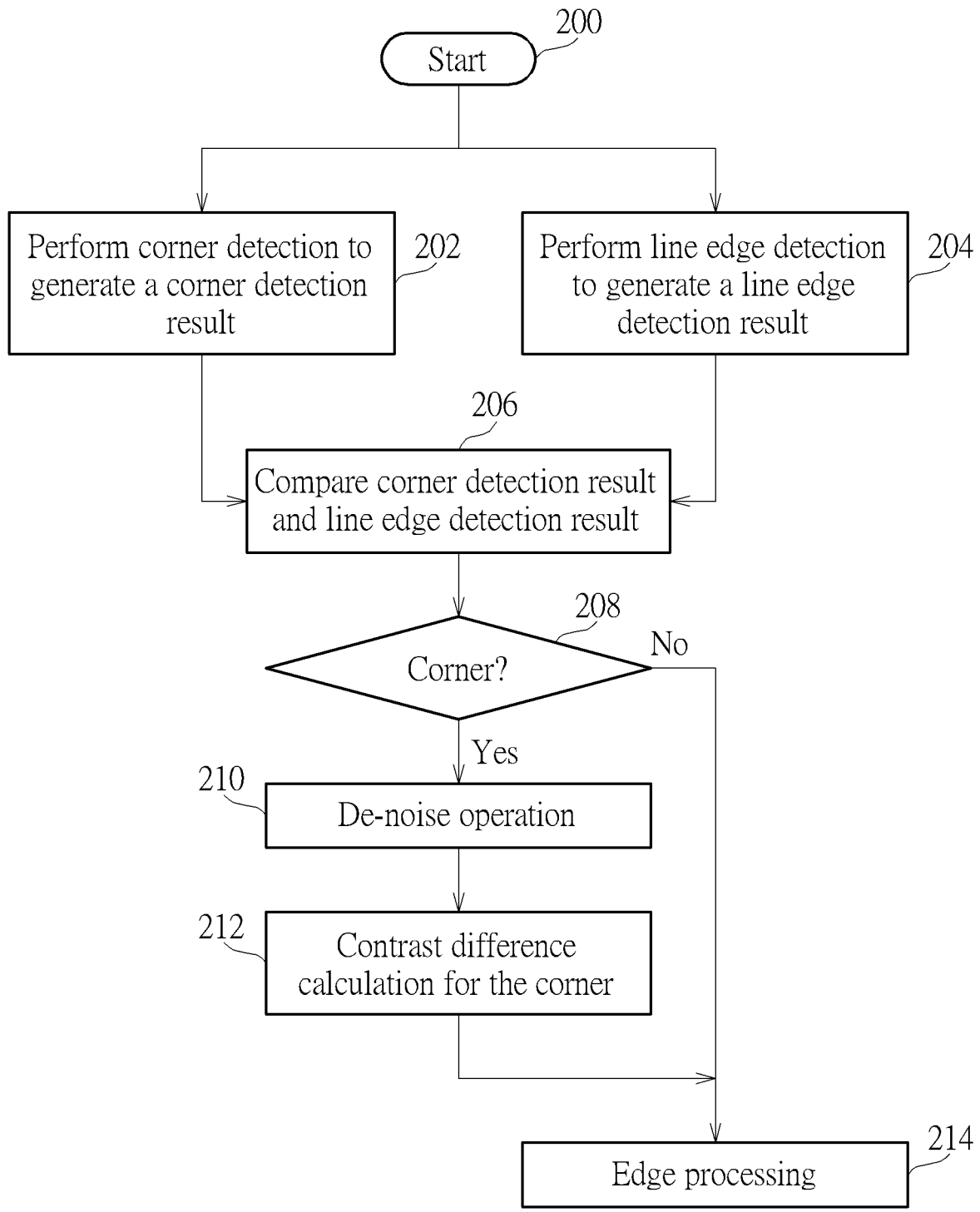
FIG. 2 is a flowchart of an image processing method according to one embodiment of the present invention.

Regarding the operation of the image processing circuit 100, refer to the flowchart shown in FIG. 2, in Step 200, the image processing circuit 100 is enabled and starts to receive image data, wherein the image data comprises a plurality of image frames. FIG. 3 shows an image frame 300, wherein the image frame 300 comprises M*N pixels P11-PMN and their pixel values (luminance values). In order to facilitate the subsequent description, each of P11-PMN will be used as its pixel value in the following formulas.

In Step 202, the corner detection circuit 110 performs corner detection on each pixel in the image frame 300 to determine whether the pixel is a corner. Specifically, referring to FIG. 4, the corner detection circuit 110 may perform corner detection on each pixel in the image frame 300 to determine which one of the corners '0' to '7' shown in FIG. 4 the pixel belongs to, wherein the direction difference of each adjacent corner is 45 degrees, that is, the corner '1' can be regarded as the result of rotating the corner '0' by 45 degrees, and the corner '2' can be regarded as the result of rotating the corner '1' by 45 degrees . . . and so on. For example, for each pixel, the corner detection circuit 110 can use the plurality of corner detection filters 510_0-510_7 shown in FIGS. 5 and 6 to detect whether the pixel belongs to one of the corners '0' to '7' shown in FIG. 4. In detail, assuming that the corner detection circuit 110 currently needs to determine which one of the corners '0' to '7' the pixel P33 belongs to, the corner detection circuit 110 can use the corner detection filter 510_0 to detect the pixel P33 first. For example, the corner detection filter 510_0 serves as corresponding weights of a 5*5 area centered on the pixel P33, and the a weighted summation is performed to generate a detection result DR0 corresponding to the corner '0', wherein the detection result DR0 can be calculated as follows:

$$DR0 = |P33*2 + P42*2 + P44*2 + P51*1 + P55*1 - \qquad (1)$$
$$P13*2 - P22*2 - P24*2 - P31*1 - P35*1|.$$

Then, the corner detection circuit 110 uses the corner detection filter 510_1 to detect the pixel P33. For example, the corner detection filter 510_1 serves as corresponding weights of a 5*5 area centered on the pixel P33, and the a weighted summation is performed to generate a detection result DR1 corresponding to the corner '1', wherein the detection result DR1 can be calculated as follows:

$$DR1 = |P33*3 + P31*1 + P32*1 + P43*1 + P53*1 - \qquad (2)$$
$$P12*1 - P13*1 - P15*2 - P25*1 - P35*1 - P45*1|.$$

Then, based on a similar calculation method, the corner detection circuit 110 uses the corner detection filters 510_2 to 510_7 to detect the pixel P33 to generate detection results DR2 to DR7 corresponding to the corner '2' to '7', respectively. The above detection results DR0-DR7 can indicate the intensity of the corners '0' to '7', that is, if the value of the detection result is larger, it means that the pixel P33 is more likely to belong to the corner corresponding to the detection result. For example, if the detection result DR3 has the largest value among the detection results DR0-DR7, it means that the pixel P33 is most likely to be the corner '3' shown in FIG. 4.

Figure 5:
FIG. 5 and FIG. 6 are diagrams illustrating a plurality of corner detection filters according to one embodiment of the present invention.
Figure 5:
Figure 5:
Figure 5:
Figure 6:
Figure 6:
Figure 6:
Figure 6:

It should be noted that the corner detection filters 510_0-510_7 shown in FIGS. 5 and 6 and the calculation methods of the detection results above are only for illustrative purposes, rather than limitations of the present invention. In other embodiments, the coefficients in the corner detection filters 510_0-510_7 can be changed according to the designer's consideration, and the detection results can be calculated in different ways. In other words, as long as the corner detection circuit 110 can use a plurality of corner detection filters to detect the pixel P33 to generate detection results corresponding to different corners, the alternative designs should fall within the scope of the present invention.

Figure 7:
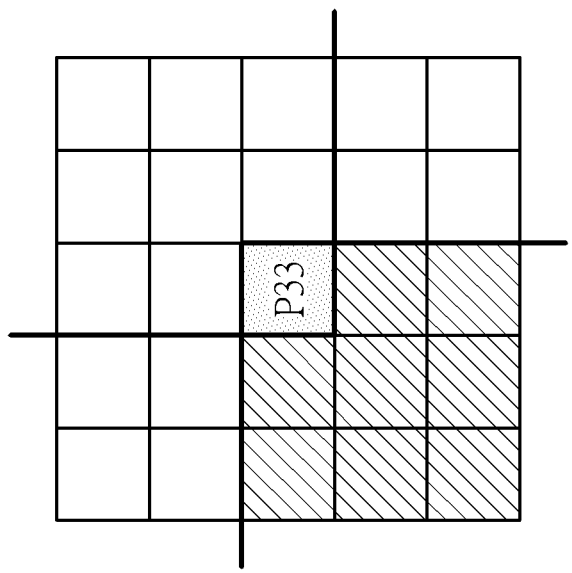
FIG. 7 shows an example of a black-white corner and a black-white corner detection filter.

In one embodiment, the pixel P33 may belong to a black-white corner, which causes two detection results in the detection results DR0-DR7 with higher values, thus causing a problem in the determination of the corner. Referring to FIG. 7, assuming that the area in the lower left corner of the pixels P11-P55 has lower luminance, the area in the upper right corner has higher luminance, and the pixel P33 has an intermediate luminance, then both the detection result DR1 and the detection result DR5 may have higher values, so that the corner detection circuit 110 cannot determine whether the pixel P33 belongs to the corner '1' or the corner '5' shown in FIG. 4. In this case, the pixel P33 can be regarded as a black-white corner. In order to solve this problem, the corner detection circuit 110 can additionally use a black-white corner detection filter to detect the pixel P33, for example, the black-white corner detection filter serves as corresponding weights of a 5*5 area centered on the pixel P33, and the a weighted summation is performed to generate a black-white corner detection result DR_BW, wherein the black-white corner detection result DR_BW can be calculated as follows:

$$DR\_BW = P33*8 + P23*1 + P32*1 + P34*1 + P43*1 - P22*2 - \qquad (3)$$
$$P24*2 - P42*2 - P44*2 - P11*1 - P15*1 - P51*1 - P55*1.$$

In this embodiment, the black-white corner detection filter is a non-directional filter with symmetrical coefficients, and the black-white corner detection result DR_BW can indicate which corner the pixel P33 belongs to. For example, if the black-white corner detection result DR_BW is a negative value, it means that the pixel P33 should belong to the corner '1'; and if the black-white corner detection result DR_BW is a positive value, it means that the pixel P33 should belong to the corner '5'. In other words, if the pixel P33 belongs to a black-white corner, in a case of conforming to the black-white corner detection result, the corner detection circuit determines that the pixel P33 belongs to the corner corresponding to the detection result with the highest value among the plurality of detection results.

It should be noted that the black-white corner detection filter shown in FIG. 7 and the calculation methods of the black-white corner detection result DR_BW above are only for illustrative purposes, rather than limitations of the present invention. In other embodiments, the coefficients in the black-white corner detection filter can be changed according to the designer's consideration, and the black-white corner detection result DR_BW can be calculated in different ways. In other words, as long as the corner detection circuit 110 can use the black-white corner detection filter to detect the pixel P33 to generate the black-white corner detection result DR_BW for the determination of the black-white corner, the alternative designs should fall within the scope of the present invention.

Figure 4:
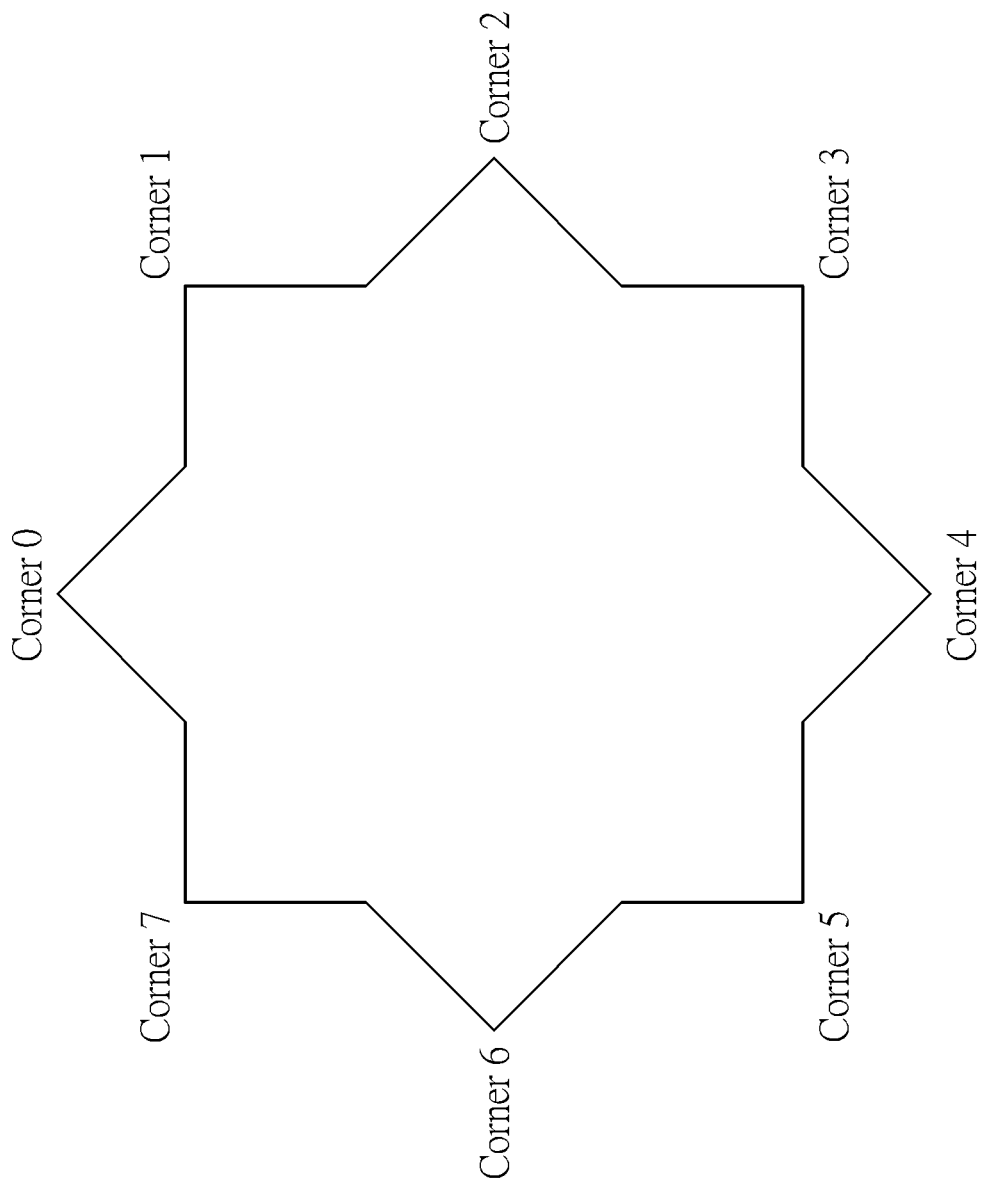
FIG. 4 shows a plurality of corners with different directions.

As described above, the corner detection circuit 110 can determine which one of the corners '0' to '7' shown in FIG. 4 the pixel P33 belongs to according to the detection results DR0-DR7, or according to the detection results DR0-DR7 and the black-white corner detection result DR_BW, to generate a corner detection result.

Meanwhile, in Step 204, the line edge detection circuit 120 performs line edge detection for each pixel in the image frame 300 to determine whether the pixel belongs to a vertical edge, a horizontal edge, a positive slope edge or a negative slope edge to generate a line edge detection result. In this embodiment, taking the pixel P33 as an example, the line edge detection circuit 120 can detect the vertical luminance gradient or the horizontal luminance gradient of the 5*5 area centered on the pixel P33, or use an edge filter such as the Sobel operator to perform the edge detection on the 5*5 area, to generate the line edge detection result. It should be noted that since the line edge detection is a prior art, and a person skilled in the art should understand its operation, the further descriptions of the line edge detection are omitted here.

In Step 206, the corner and edge processing circuit 130 receives the corner detection result and the line edge detection result from the corner detection circuit 110 and the line edge detection circuit 120, respectively, and the corner detection result and the line edge detection result are analyzed to determine whether the pixel P33 belongs to a corner or a line edge. In one embodiment, the designer can adjust the coefficients of the corner detection filters 510_0-510_7 used by the corner detection circuit 110 and the coefficients of the Sobel operator used by the line edge detection circuit 120, so as to make the corner and edge processing circuit 130 be able to directly compare the values of the corner detection result and the line edge detection result to determine whether the pixel P33 belongs to the corner or the line edge.

In Step 208, the corner and edge processing circuit 130 determines if the pixel belongs to the corner, if yes, the flow enters Step 210; and if not, the flow enters Step 214.

In Step 210, the corner and edge processing circuit 130 performs de-noising operation on the pixel P33, so that the corner can be smoother. For example, the corner and edge processing circuit 130 can select one of corner protection filters 810_0-810_7 shown in FIGS. 8 and 9 according to which corner the pixel P33 belongs to, so as to perform the de-noising processing on the pixel P33. For example, if the pixel P33 belongs to the corner '0' shown in FIG. 4, the corner protection filter 810_0 is used for the de-noising operation; and if the pixel P33 belongs to the corner '1' shown in FIG. 4, the corner protection filter 810_1 is used for the de-noising operation. Taking the pixel P33 belonging to the corner '0' as an example, the corner protection filter 810_0 serves as corresponding weights of a 5*5 area centered on the pixel P33, and the corner and edge processing circuit 130 performs a weighted summation on the 5*5 area with the corner protection filter 810_0 to generate a de-noised pixel value P33', wherein the de-noised pixel value P33' can be calculated as follows:

$$P33'=(P33*4+P42*2+P44*2+P51*1+P55*1)/8 \qquad (4).$$

Figure 8:
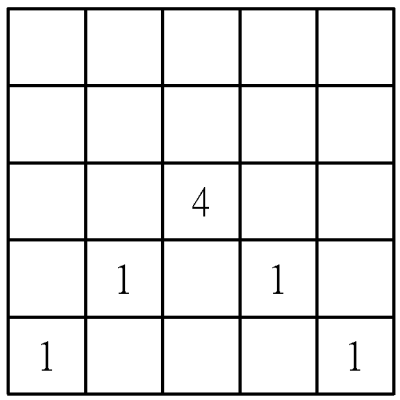
FIG. 8 and FIG. 9 are diagrams illustrating a plurality of corner protection filters according to one embodiment of the present invention.
Figure 8:
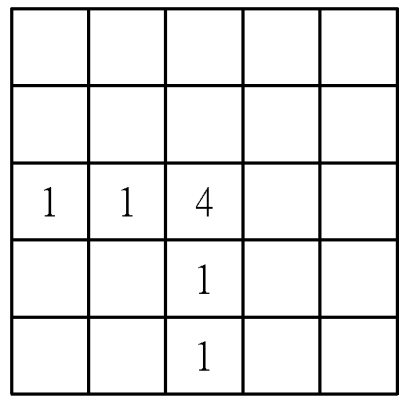
Figure 8:
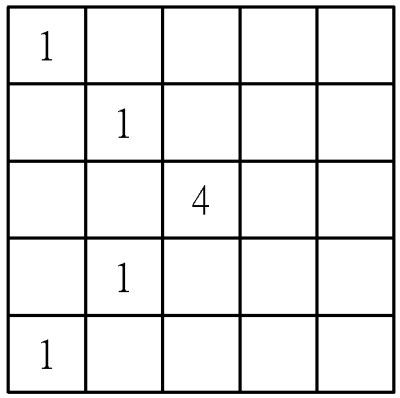
Figure 8:
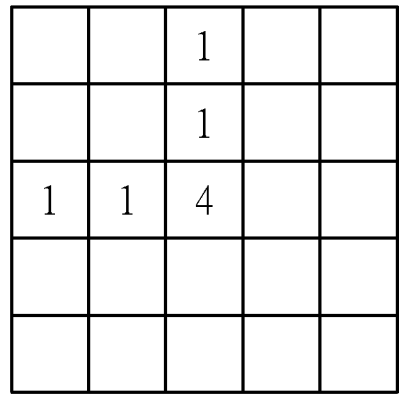
Figure 9:
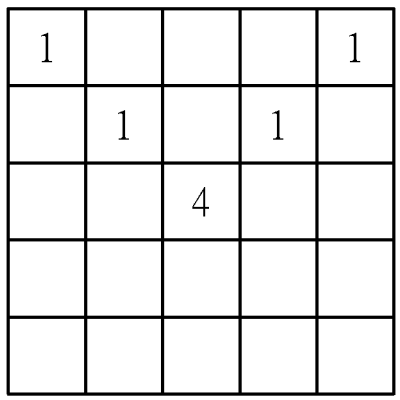
Figure 9:
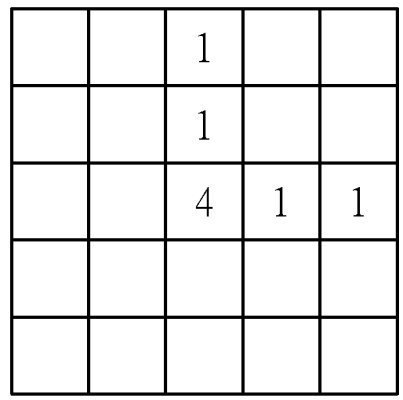
Figure 9:
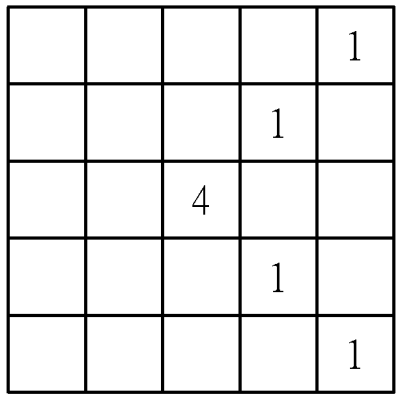
Figure 9:
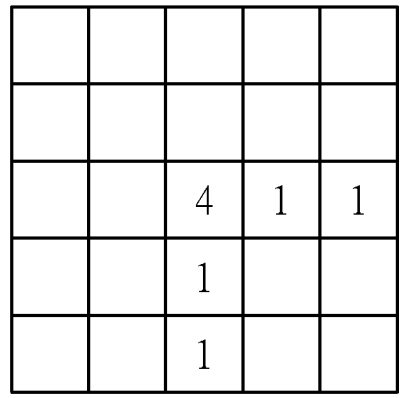

It should be noted that the corner protection filters 810_0-810_7 shown in FIGS. 8 and 9 and the calculation methods of the de-noised pixel value above are only for illustrative purposes, rather than limitations of the present invention. In other embodiments, the coefficients in the corner protection filters 810_0-810_7 can be changed according to the designer's consideration, and the de-noised pixel value can be calculated in different ways. In another embodiment, considering that the pixel P33 as the corner may be distorted due to the processing of the pre-stage circuit, the calculation of the de-noised pixel value P33' can ignore the original pixel value of the pixel P33, and the de-noised pixel value P33' can be obtained by using the average of the pixel values of the surrounding pixels. For example, the de-noised pixel value P33' can be calculated as follows:

$$P33'=(P42*2+P44*2+P51*1+P55*1)/4 \qquad (5).$$

In Step 212, the corner and edge processing circuit 130 performs a contrast difference calculation on the pixel P33 to determine a sharpness of the corner for reference in subsequent image processing. For example, the corner and edge processing circuit 130 can select a corresponding operator to perform the contrast difference calculation according to which corner the pixel P33 belongs to. FIG. 10 shows operators corresponding to the corner '0' and the corner '1' for the contrast difference calculation, and the operators of the corners '2'-'7' can be obtained by rotating the operators of corner '0' and corner '1', respectively. For example, the operator of the corner '2' is a result of rotating the operator of the corner '0' by 90 degrees clockwise, the operator of the corner '3' is a result of rotating the operator of the corner '1' by 90 degrees clockwise, and so on, so the other operators are not shown in the drawings.

Taking the pixel P33 belonging to the corner '0' as an example, the operator of the corner '0' shown in FIG. 10 serves as corresponding weights of a 5*5 area centered on the pixel P33, and the corner and edge processing circuit 130 performs a weighted summation on the 5*5 area with the operator of the corner '0' to generate a contrast difference calculation result CR, wherein the contrast difference calculation result CR can be calculated as follows:

$$CR = (P33*8 + P42*6 + P44*6 - P13*1 - P22*3 - \qquad (6)$$
$$P23*1 - P24*3 - P31*3 - P32*1 - P34*1 - P35*3).$$

In Step 214, the corner and edge processing circuit 130 may perform edge processing, such as edge sharpness adjustment, on the pixels of the image frame 300.

As described above, by using the method of described in the above embodiments, the image processing circuit 100 can accurately determine whether each pixel belongs to one of the corner '0'-'7' shown in FIG. 4, so as to perform suitable operation on the pixel to improve image quality. In addition, the operations of the above embodiments do not involve complex operations such as the spatial differentiation included in Harris corner detection, so it is suitable to be implemented in circuits.

Figure 11:
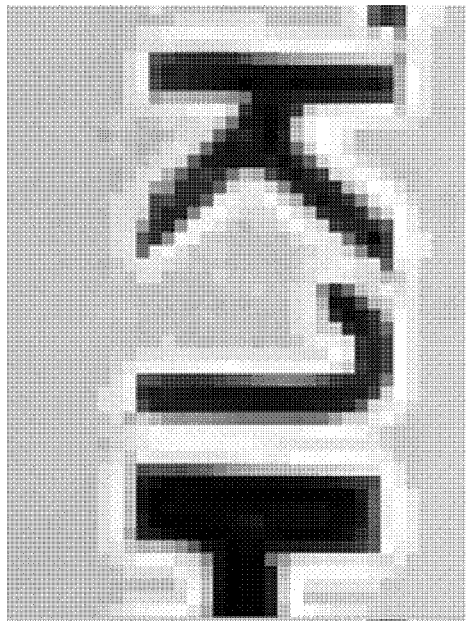
FIG. 11 is a diagram illustrating that the corner of the image in the prior art becomes blurred due to improper image processing, and the corner is clear using the method of this embodiment.
Figure 11:
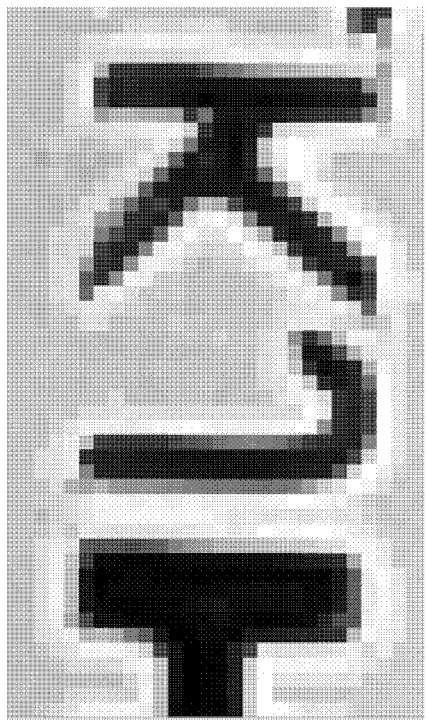

FIG. 11 is a diagram illustrating that the corner of the image in the prior art becomes blurred due to improper image processing, and the corner is clear using the method of this embodiment. As shown in FIG. 11, the image processing method of this embodiment can indeed improve the quality of corners in the images.

Briefly summarized, in the image processing circuit and image processing method of the present invention, the corner detection is performed on each pixel by using a plurality of corner detection filters to generate a plurality of detection results, and then the plurality of detection results are used to determine which one of the corners with different directions the pixel belongs to, so that it is possible to know exactly which corner the pixel belongs to, and to perform appropriate image processing on the pixel accordingly. Therefore, the image processing of the present invention can make the corner of the image have better display quality.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An image processing method, comprising:
   using a plurality of corner detection filters to perform corner detection on a specific pixel of image data to generate a plurality of detection results, respectively, wherein the plurality of corner detection filters correspond to a plurality of corners with different directions, respectively;
   determining which one of the plurality of corners with different directions the specific pixel belongs to according to the plurality of detection results; and
   according to a specific corner among the plurality of corners to which the specific pixel belongs, performing an image processing operation corresponding to the specific corner on the specific pixel to generate processed image data;
   using a black-white corner detection filter to perform a black-white corner detection on the specific pixel of the image data to generate a black-white corner detection result, wherein the black-white corner detection filter is a filter with symmetrical coefficients; and
   the step of determining which one of the plurality of corners with different directions the specific pixel belongs to according to the plurality of detection results comprises:
      determining which one of the plurality of corners with different directions the specific pixel belongs to according to the plurality of detection results and the black-white corner detection result.

2. The image processing method of claim 1, wherein the plurality of corner detection filters comprise at least eight different corner detection filters.

3. The image processing method of claim 1, wherein the plurality of detection results indicate intensities of the specific pixel corresponding to the plurality of corners, and the step of determining which one of the plurality of corners with different directions the specific pixel belongs to according to the plurality of detection results comprises:
   determining that the specific pixel belongs to the corner corresponding to the detection result with the highest intensity among the plurality of detection results.

4. The image processing method of claim 1, wherein the plurality of detection results indicate intensities of the specific pixel corresponding to the plurality of corners, and the step of determining which one of the plurality of corners with different directions the specific pixel belongs to according to the plurality of detection results and the black-white corner detection result comprises:
   in a case of conforming to the black-white corner detection result, determining that the specific pixel belongs to the corner corresponding to the detection result with the highest intensity among the plurality of detection results.

5. The image processing method of claim 1, wherein the step of performing the image processing operation corresponding to the specific corner on the specific pixel to generate the processed image data comprises:
   according to the specific corner among the plurality of corners to which the specific pixel belongs, selecting a specific corner protection filter corresponding to the specific corner from a plurality of corner protection filters; and
   using the specific corner protection filter to de-noise the specific pixel for generating the processed image data.

6. The image processing method of claim 5, wherein the plurality of corner detection filters comprise at least eight different corner detection filters, and the plurality of corner protection filters comprise at least eight different corner protection filters.

7. The image processing method of claim 1, wherein the step of performing the image processing operation corresponding to the specific corner on the specific pixel to generate the processed image data comprises:
   according to the specific corner among the plurality of corners to which the specific pixel belongs, selecting a specific operator corresponding to the specific corner from a plurality of operators; and
   using the specific operator to perform a contrast difference calculation on the specific pixel for generating the processed image data.

8. An image processing circuit, comprising:
   a corner detection circuit, configured to use a plurality of corner detection filters to perform corner detection on a specific pixel of image data to generate a plurality of detection results, respectively, wherein the plurality of corner detection filters correspond to a plurality of corners with different directions, respectively; and determine which one of the plurality of corners with different directions the specific pixel belongs to according to the plurality of detection results; and
   a corner and edge processing circuit, wherein according to a specific corner among the plurality of corners to which the specific pixel belongs, the corner and edge processing circuit performs an image processing operation corresponding to the specific corner on the specific pixel to generate processed image data;
   wherein the corner detection circuit uses a black-white corner detection filter to perform a black-white corner detection on the specific pixel of the image data to generate a black-white corner detection result; and the corner detection circuit determines which one of the plurality of corners with different directions the specific pixel belongs to according to the plurality of detection results and the black-white corner detection result;
   wherein the black-white corner detection filter is a filter with symmetrical coefficients.

9. The image processing circuit of claim 8, wherein the plurality of corner detection filters comprise at least eight different corner detection filters.

10. The image processing circuit of claim 8, wherein the plurality of detection results indicate intensities of the specific pixel corresponding to the plurality of corners, and the corner detection circuit determines that the specific pixel belongs to the corner corresponding to the detection result with the highest intensity among the plurality of detection results.

11. The image processing circuit of claim 8, wherein the plurality of detection results indicate intensities of the specific pixel corresponding to the plurality of corners, and in a case of conforming to the black-white corner detection result, the corner detection circuit determines that the specific pixel belongs to the corner corresponding to the detection result with the highest intensity among the plurality of detection results.

12. The image processing circuit of claim 8, wherein according to the specific corner among the plurality of corners to which the specific pixel belongs, the corner and edge processing circuit selects a specific corner protection filter corresponding to the specific corner from a plurality of corner protection filters, and uses the specific corner protection filter to de-noise the specific pixel for generating the processed image data.

13. The image processing circuit of claim 12, wherein the plurality of corner detection filters comprise at least eight different corner detection filters, and the plurality of corner protection filters comprise at least eight different corner protection filters.

14. The image processing circuit of claim 8, wherein according to the specific corner among the plurality of corners to which the specific pixel belongs, the corner and edge processing circuit selects a specific operator corresponding to the specific corner from a plurality of operators, and uses the specific operator to perform a contrast difference calculation on the specific pixel for generating the processed image data.

* * * * *